US012293235B2

(12) United States Patent
McDiarmid et al.

(10) Patent No.: US 12,293,235 B2
(45) Date of Patent: May 6, 2025

(54) SYSTEMS AND METHODS FOR MANAGING MULTI-COMPONENT, MULTI-DEPLOYMENT INFRASTRUCTURE-AS-CODE CONFIGURATIONS FOR CLOUD COMPUTING PLATFORMS

(71) Applicant: HashiCorp, San Francisco, CA (US)

(72) Inventors: Alisdair McDiarmid, Toronto (CA); Chris Arcand, Minneapolis, MN (US); Martin Atkins, Portland, OR (US); Brian Earwood, Memphis, TN (US); Sarah Hernandez, Union City, CA (US)

(73) Assignee: HashiCorp, San Francisco, CA (US)

( * ) Notice: Subject to any disclaimer, the term of this patent is extended or adjusted under 35 U.S.C. 154(b) by 0 days.

(21) Appl. No.: 18/756,694

(22) Filed: Jun. 27, 2024

(65) Prior Publication Data

US 2025/0117263 A1    Apr. 10, 2025

Related U.S. Application Data

(60) Provisional application No. 63/543,473, filed on Oct. 10, 2023.

(51) Int. Cl.
| G06F 9/46 | (2006.01) |
| G06F 9/50 | (2006.01) |
| G06F 9/54 | (2006.01) |
| H04L 67/00 | (2022.01) |
| H04L 67/1095 | (2022.01) |

(52) U.S. Cl.
CPC .......... *G06F 9/5077* (2013.01); *G06F 9/5072* (2013.01); *G06F 9/547* (2013.01); *H04L 67/1095* (2013.01); *H04L 67/34* (2013.01)

(58) Field of Classification Search
CPC ...................................................... G06F 9/5077
USPC .......................................................... 718/104
See application file for complete search history.

(56) References Cited

U.S. PATENT DOCUMENTS

| 10,200,246 B1* | 2/2019 | Rachamadugu .... H04L 41/0806 |
| 10,872,029 B1* | 12/2020 | Bawcom ............. G06F 21/6218 |
| 11,086,685 B1* | 8/2021 | Koppes ............... G06F 9/45558 |

(Continued)

*Primary Examiner* — Mehran Kamran
(74) *Attorney, Agent, or Firm* — FisherBroyles LLP; James P. Cleary

(57) ABSTRACT

A system and method employed by an infrastructure-as-code (IaC) tool that is configured for defining IaC configurations comprising containers of interconnected components of a cloud computing platform. A system includes a graph generator configured to generate a graph of dependencies between the interconnected components of the cloud computing platform based at least in part on user-defined input-output relationships between the interconnected components. The IaC tool is configured to use the graph of dependencies to automatically determine a sequence of the provisioning or deployment of the interconnected components of the cloud computing platform. The system further includes a remote procedure call interface configured to enable communications between the IaC tool and the cloud computing platform, the remote procedure call interface further configured to enable the provisioning or deployment of the interconnected components of the cloud computing platform, in the determined sequence.

20 Claims, 6 Drawing Sheets

(56) References Cited

U.S. PATENT DOCUMENTS

| | | | | |
|---|---|---|---|---|
| 11,669,364 | B2* | 6/2023 | Hashimoto | G06F 9/5077 |
| | | | | 718/102 |
| 11,853,802 | B1* | 12/2023 | Wei | G06F 9/45558 |
| 12,028,224 | B1* | 7/2024 | Kwatra | H04L 41/084 |
| 12,067,425 | B2* | 8/2024 | Oluyemi | G06F 9/44505 |
| 2017/0289060 | A1* | 10/2017 | Aftab | H04L 67/1097 |
| 2020/0183707 | A1* | 6/2020 | Hashimoto | G06F 9/5077 |
| 2020/0183739 | A1* | 6/2020 | Hashimoto | G06F 9/5077 |
| 2020/0186416 | A1* | 6/2020 | Hashimoto | G06F 8/60 |
| 2020/0186424 | A1* | 6/2020 | Hashimoto | G06F 9/44505 |
| 2021/0055917 | A1* | 2/2021 | Khakare | G06F 3/0482 |
| 2021/0208934 | A1* | 7/2021 | Jadhav | G06F 8/60 |
| 2021/0359920 | A1* | 11/2021 | Welch | H04L 67/10 |
| 2022/0188161 | A1* | 6/2022 | Mohan | G06F 16/2365 |
| 2022/0224707 | A1* | 7/2022 | Kapoor | G06F 9/455 |
| 2022/0229637 | A1* | 7/2022 | Benassi | G06F 8/427 |
| 2022/0365835 | A1* | 11/2022 | Kandasamy | G06F 11/0793 |
| 2023/0004431 | A1* | 1/2023 | Lee | H04L 41/0866 |
| 2023/0132503 | A1* | 5/2023 | Plotnik | G06F 21/577 |
| | | | | 726/25 |
| 2023/0214238 | A1* | 7/2023 | Yitzhaki | G06F 9/451 |
| | | | | 719/320 |
| 2023/0254330 | A1* | 8/2023 | Singh | G06F 11/323 |
| | | | | 726/23 |

* cited by examiner

SYSTEMS AND METHODS FOR MANAGING MULTI-COMPONENT, MULTI-DEPLOYMENT INFRASTRUCTURE-AS-CODE CONFIGURATIONS FOR CLOUD COMPUTING PLATFORMS

CROSS REFERENCE TO RELATED APPLICATIONS

The current application claims priority under 35 U.S.C. § 119 (e) to provisional application Ser. No. 63/543,473 filed Oct. 10, 2023. The disclosure of the application cited in this paragraph is incorporated herein by reference in its entirety.

TECHNICAL FIELD

The subject matter described herein relates to cloud computing infrastructure, and more particularly to systems and methods to organize infrastructure-as-code configurations and execute the orchestration of configurations across multiple components and deployments.

BACKGROUND

Several platforms exist to define, provision and deploy resources for cloud computing infrastructures, such as data centers, cloud application platforms, etc. One prominent such platform is Terraform®, created by HashiCorp Inc., which is a source-available, infrastructure-as-code (IaC) tool that allows users to define and provision cloud computing resources based on specific user needs, and from any cloud computing providers or deployments. An IaC tool like Terraform® manages external resources, such as public cloud infrastructure, private cloud infrastructure, network appliances, software-as-a-service (SaaS), and platform-as-a-service (PaaS), with any of a number of various cloud infrastructure providers.

An IaC system maintains an extensive list of official providers and can also integrate with community-developed providers. Users define their infrastructure by declaring resources or by calling data sources. Terraform uses one or more declarative configurations to describe a desired final state of a resource for an infrastructure. Once a user invokes Terraform® on a given resource, Terraform® performs functions such as Create, Read, Update, and Delete (CRUD) actions on the user's behalf to accomplish a desired state of each resource. The infrastructure-as-code can be written as modules as part of an overall system, promoting reusability and maintainability.

Typically, each IaC tool such as Terraform® has at least one module defining the configuration, known as its root module. For example, each root module consists of resources defined in the Terraform® file in the main working directory of the configuration. The root module can call other modules, known as child modules, to include the child modules' resources into the configuration in a concise way.

To optimize cloud configurations for speed, security, and maintainability, users typically adopt a small, modular, and composable approach to infrastructure management. While this approach offers many benefits, it creates challenges when users need to plan and apply multiple root modules together. Currently, users must first understand the dependencies among multiple root modules, and deploy each root module one-by-one and in the correct order either manually or through explicit configuration of sequencing and dependencies using a custom-created or third-party tool that chains, or schedules, execution. This complexity is compounded when users need to deploy the same infrastructure multiple times, such as across multiple cloud provider accounts, environments, regions, or "landing zones," which are multi-account, cloud computing environments defined by security, networking, and access parameters. As organizations scale their infrastructure-as-code usage, the burden of managing each infrastructure root module individually becomes increasingly difficult.

Accordingly, managing complex infrastructure-as-code systems has been a source of problems. For example, as users expand their cloud configurations, such as by using a tool like Terraform®, they encounter some challenges. The first challenge arises when modules or workspaces become too large. Each workspace can be defined as multiple files, but it can contain too many resources that starts to slow down execution, and also increases the "blast radius," or potential that a mistake in one resource could impact other resources. When workspaces become too large, the complexity impacts the blast radius risk, as well as the cognitive load of working with the configuration, so the need to refactor the workspace in an organized manner becomes a necessity. It is not the size of the configuration per se that causes problems, but the number of resources managed in a single resource graph/state file. Eventually, when the graph of connections between resources reaches a certain size and complexity, issues with performance and blast radius noted above are seen.

Typically, to refactor the workspace, users will want to divide a workspace into two or more smaller ones to make it easier to manage and reduce risk. However, this is more complex than just changing the files, and requires code splitting without an easy way to plan, apply, and destroy modules/workspaces together. The term "code splitting" as used here is more centered around splitting up, or refactoring, state files and not necessarily the code itself. That requires careful work to do the initial refactor and move resources around, and then poses a secondary challenge around how to ensure that the correct ordering between workspaces is preserved without anything available to enforce it.

The second challenge involves managing multiple instances of the same infrastructure, often leading users to copy and paste code, where changes to the original configuration do not automatically propagate to the copied/pasted configuration, often leading to code duplication, increasing complexity, lack of synchronization, and reduced maintainability. These problems can arise early when defining, provisioning and deploying resources, which has led the open source software (OSS) community to build a suite of tools geared towards addressing these fundamental issues in provisioning workflows.

SUMMARY

Disclosed herein are systems and methods for managing multi-component, multi-deployment infrastructure-as-code (IaC) configurations for cloud computing platforms. The systems and methods further manage relationships between components or deployments of the IaC configurations. In some implementations, the systems and methods described herein are configured to generate and provide a graph of interconnected components, which can be replicated across many independent cloud computing deployments.

These systems, referred to herein as "stacks," and methods of using the same, include a stacks feature or tool, which provides an extension for an IaC tool that reduces the time and overhead of managing infrastructure. By defining, utilizing and managing stacks, users can optimize the coordination, deployment, and management of interdependent IaC configurations. The stacks feature empowers users to rapidly and consistently create and modify infrastructure setups with differing inputs. Further, the stacks feature enables complex workflows with a simple set of user actions.

In some aspects, a system and method for defining multi-component, multi-deployment cloud infrastructure-as-code (IaC) configurations for a cloud computing platform is described. The system includes a graph generator configured to generate a graph of dependencies between the interconnected components of the cloud computing platform based at least in part on user-defined input-output relationships between the interconnected components. The IaC tool is configured to use the graph of dependencies to automatically determine a sequence of the provisioning or deployment of the interconnected components of the cloud computing platform. The system further includes a remote procedure call interface configured to enable communications between the IaC tool and the cloud computing platform, the remote procedure call interface further configured to enable the provisioning or deployment of the interconnected components of the cloud computing platform, in the determined sequence.

In other aspects, a computer program product comprising a non-transitory machine-readable medium storing instructions that, when executed by at least one programmable processor, cause the at least one programmable processor to perform operations that include generating, by a graph generator of an infrastructure-as-code (IaC) tool, a graph of dependencies between the interconnected components of the cloud computing platform based at least in part on user-defined input-output relationships between the interconnected components. The IaC tool is configured to use the graph of dependencies to automatically determine a sequence of the provisioning or deployment of the interconnected components of the cloud computing platform. The operations further include enabling, a remote procedure call interface, communications between the IaC tool and the cloud computing platform, the remote procedure call interface further configured to enable the provisioning or deployment of the interconnected components of the cloud computing platform, in the determined sequence.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to multi-component, multi-deployment IaC cloud computing configurations, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
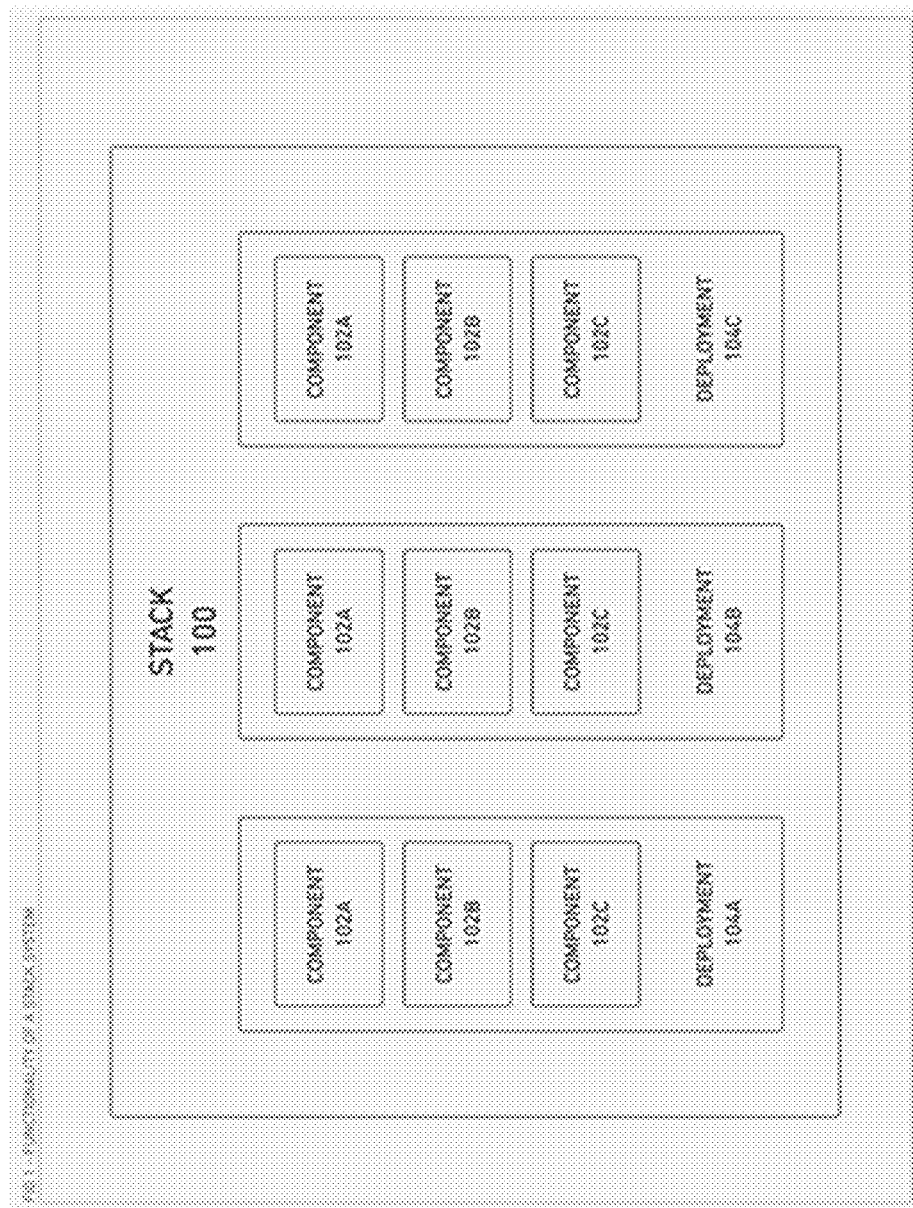
FIG. 1 shows a diagram illustrating aspects of a system showing features consistent with implementations of the current subject matter.

This document describes systems and methods for managing multi-component, multi-deployment infrastructure-as-code (IaC) configurations, and their relationships, for cloud computing platforms and deployments thereof. In some implementations, the systems and methods described herein are configured to generate and provide a graph of interconnected components, which are composed of a number of computing resources and data sources, and which can be replicated across many independent cloud computing deployments. A component is itself a root module, and therefore the systems described herein are configured to generate a graph of interconnected root modules. Previously, there's been no systematic way to express dependencies between root modules. The graph defines the dependencies between the interconnected components, and then other cloud-based workflows use those dependencies for the provisioning, orchestration, and management. Thus, the graph does not fully define the provisioning, but informs the order of operations, sequencing, and dependency of the interconnected components.

The systems and methods executed thereby described herein are referred to herein as "stacks." Stacks are preferably configured as a native feature of an IaC tool and/or IaC system, and not a wrapper (i.e., built on top of the IaC tool) or separate binary as in other types of solutions. Unlike conventional IaC and cloud platform workflows and execution models, the stacks feature preferably utilizes a gRPC interface for a cloud deployment, which is a protocol used to enable remote procedure calls, but can be substituted with another protocol without loss of generality. As such, in preferred implementations, stack configuration files (for example, as denoted *.tfstack.hcl) express components and the relationships between them and the inputs that are expected by the stack. Deployment configuration files are responsible for all of the specifics: defining how many instances of the stack should exist, the specific inputs for each unique instance, and what relationship those instances should have to each other.

An IaC configuration typically includes complex dependencies between multiple components. Providers of IaC tools like Terraform® are a source of resource types and/or data for a component that the IaC tool can manage, and which are integrated with the cloud computing platform via a plugin and application programming interface (API). Stacks preferably support intra-component dependencies natively by including logic describing how data is passed between components of a configuration. In accordance with implementations described herein, an IaC tool like Terraform® will employ stacks to automatically order the component planning on behalf of the user and defer changes in other components as necessary.

In some instances, a system for defining a multi-component and multi-deployment Infrastructure as Code configuration that can be processed as a graph of dependencies between components is implemented as an extension of the IaC tool, hereinafter referred to as a "stacks extension" or "stacks." The RPC interface between the IaC tool and IaC cloud enables provisioning, orchestration, and management of stacks. A user can describe dependencies through a graph, which are either implicitly computed or in some cases explicitly defined. The graph enables management of a common set of components across multiple distinct deployments. The IaC tool is enhanced to manage planning and deployment for users, where the IaC maintains "awareness" of the dependencies between components. Because the graph is a feature that is native, this enables making parallel changes and intelligent ordering of operations. In effect, because the IaC tool builds a graph of the dependencies, it can determine what operations are safe to perform in parallel (e.g. they have no dependency on each other), and where order needs to be explicitly defined (e.g. create resource A first, then resource B, because B depends on A). With the full graph of dependencies, the IaC tool can both determine how to sequence the changes intelligently, and which changes to execute as quickly as possible.

There is an integration between the IaC tool and an IaC Cloud (cloud computing infrastructure), which, through remote procedure and/or API calls, allows the IaC tool to enable functionality like policy enforcement through the IaC Cloud. The IaC cloud is configured to enforce policy as part of orchestration of stacks, manages dependencies between multiple stacks, and triggers orchestration actions based on changes in dependencies. The IaC cloud enables defining custom workflows and rules between deployments, so that users can do more advanced workflows, such as promoting a change from one environment to multiple environments.

As used herein, a "stack" is a container for infrastructure objects that together represent a self-contained system, or at least a system which itself provides a well-defined interface to other systems. Stacks are not the same as workspaces, however, stacks are like workspaces in that they "live" inside, or are uniquely associated with, projects. Accordingly, in preferred implementations, every stack belongs to exactly one project, and a cloud platform is organized in a hierarchy: an "organization" is a top level that can contain one more "projects," which in turn can contain one or more stacks or workspaces, among other things.

A "deployment" represents the use-case of repeating the same infrastructure objects multiple times and updating those copies separately. A "component" represents the use-case of splitting a complex system into smaller parts that still have interdependencies and would typically be planned and applied together. Each component preferably uses one or more IaC modules and allows passing outputs from one component in a stack as inputs to another. The IaC tool utilizes stacks to infer provision-time dependencies between components from these input/output relationships, building a dependency graph that allows for automatic sequencing of execution, which involves creating, updating and/or destroying resources as needed.

Preferably, the "components" block(s) in a stack directly references a shared module, either defined locally or in a public or private registry. Components can give more structure and visibility in an IaC configuration, as for example components can be used to decompose a large configuration into smaller, more manageable components, in effect providing an abstraction layer to structure a larger configuration. In a preferred embodiment, the IaC tool uses "plans" before execution: the IaC tool will first plan all the changes, allow a user to review the plan, and then execute on the plan. A "stack plan" is basically a plan of all the changes the IaC tool will make (create, update, delete resources, for example). Stack plans are broken down by component and viewable from a user interface. Additionally, a stack enables additional functionalities on top of what modules and components in an IaC tool already provide, such as dynamic provider configurations, for example. In another example, in addition to a module reference, the component block in a stack configuration allows defining input variables to pass into each module, whether shared or not. These inputs can consist of static input values, as well as output values from other components in the same stack. The component block of a stack also accepts a reference to a provider configuration, which is passed into and used by the shared module referenced by the component.

FIG. 1 illustrates a stack 100 in accordance with implementations disclosed herein. The stack 100 includes definitions of components 102 of one or more deployments 104, depicted in FIG. 1 as components 102A-102C of each of deployments 104A-104C. As described in further detail below, each component 102 and set of components 102A-102C preferably includes configurations for a network for the cloud-based infrastructure, secrets management (i.e. passwords, certificates, etc.), compute resources, and database configurations. Components 102 are not restricted to these examples, and a user can have one or more components to manage any type of resource supported by the IaC tool. The deployments 104 include configuration of distinct operating environments, such as production, quality assurance, and staging environments, all of which are further described below. Deployments are not restricted to these examples, and a user can have one or more deployments to map into many different environments, data centers, regions, cloud providers, or other deployment topologies.

In accordance with implementations described herein, systems and methods are configured to provide one or more stacks 100 as one or more new layer(s) on top of one or more IaC modules, to allow them to be composed, de-duplicated, and modified in the context of a larger provisioning and deployment system. The systems and methods define a new syntax, such as new "keywords" that allow defining the stacks within the configuration language for managing stacks, and which extends the infrastructure-as-code concept to encompass this layer of infrastructure management. Stacks alleviate these challenges by streamlining infrastructure management, allowing users to coordinate, deploy, and manage interdependent IaC configurations with different inputs through a single action.

A stack instance does not need to map in any way to a team boundary, nor is a stack necessarily configured to be managed or owned by a single team. An application deployment may have a networking, compute, and/or database component, all owned by separate teams. While ownership of these components may fall under separate teams, there are still benefits to planning and applying these changes together, because outputs from one component can impact another. Instead of trying to organize these components in separate stacks, in some implementations external measures like CODEOWNERS are leveraged to create ownership boundaries, while still enabling the components in the stack to be planned and applied as a single unit.

In preferred implementations, a stack is used when a configuration is planned to be deployed more than one time (such as across environments like development, staging, production, etc.) and there is a need for a way to manage instances of the configuration together. A stack can also be used to optimize the coordination, deployment, and management of interdependent IaC configurations.

Figure 2:
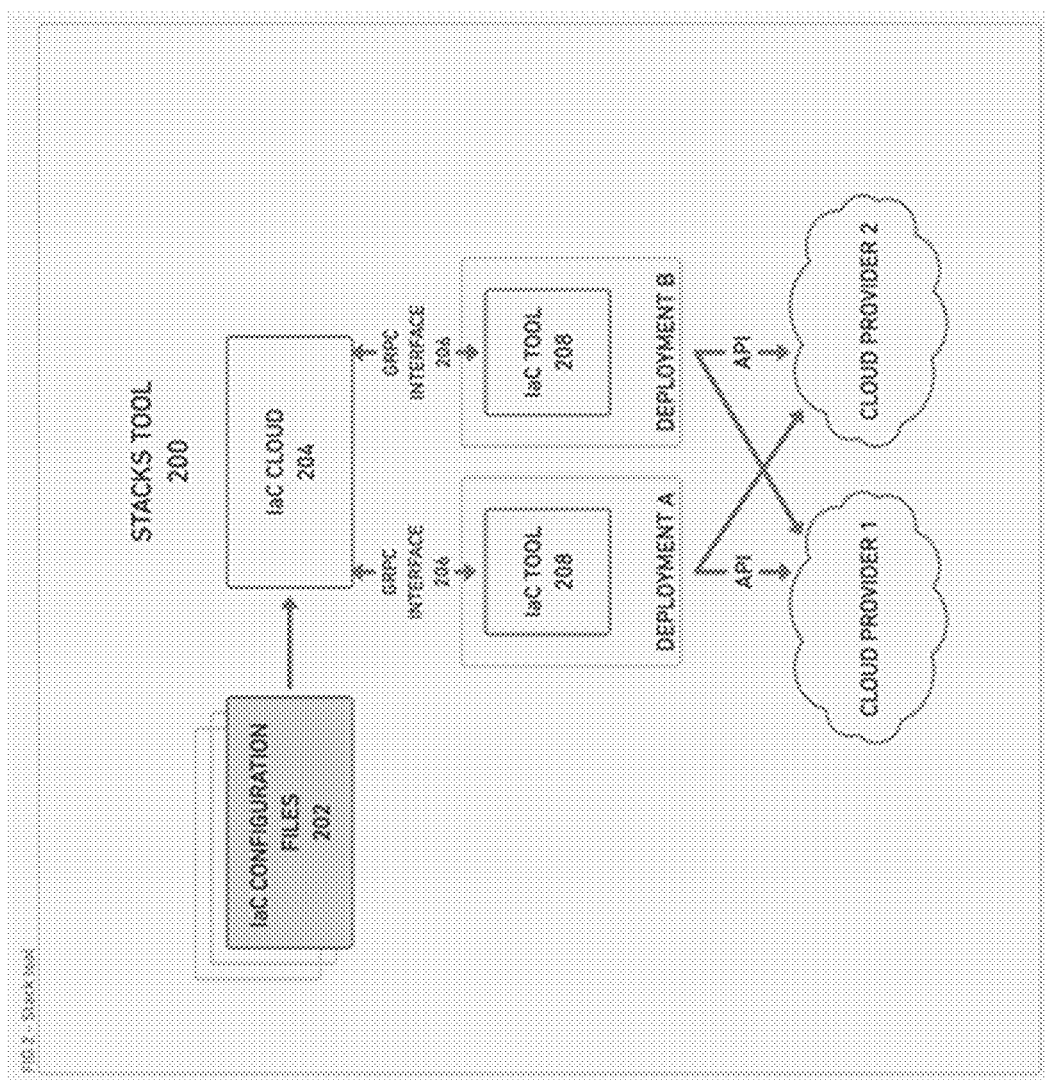
FIG. 2 is a high-level depiction of a stack showing core and cloud interaction and functionality.

As shown in FIG. 2, a stacks tool and system 200 is preferably configured as a native feature of an IaC tool 208 and IaC cloud infrastructure 204, and not a wrapper or its own binary. The IaC tool 208 provides language definition and allows users to define components of the IaC cloud infrastructure 204. The stacks tool and system 200 utilizes a gRPC interface 206 for each cloud deployment. Thus, stack configuration files 202 define the stack components, and the deployment configuration files define the details of the deployment environment (i.e., "deployment A" and "deployment B").

The configuration files 202 are written by the user to define the infrastructure, stack configuration and deployment configuration, and are provided to the IaC cloud (204). The IaC tool 208 integrates and interoperates with the IaC Cloud (204) to orchestrate the management of stacks. The Managed Service (which includes 202 and 204) may provide additional capabilities integrated with stacks, such as policy enforcement, visibility, access control, approval workflows, etc. As examples, policy enforcement allows users to define policies that govern what changes are allowed or not. Visibility can include providing one or more human-readable user interfaces, such as dashboards for a user to see all of the stack plans and "applies," i.e., which resources were impacted, status of changes, error messages, etc. Access control relates to the ability to limit who has visibility and can make certain changes or perform certain operations with a stack, while approval workflows relate to the ability to create an approval workflow that governs who can initiate and approve execution of a plan.

Figure 3:
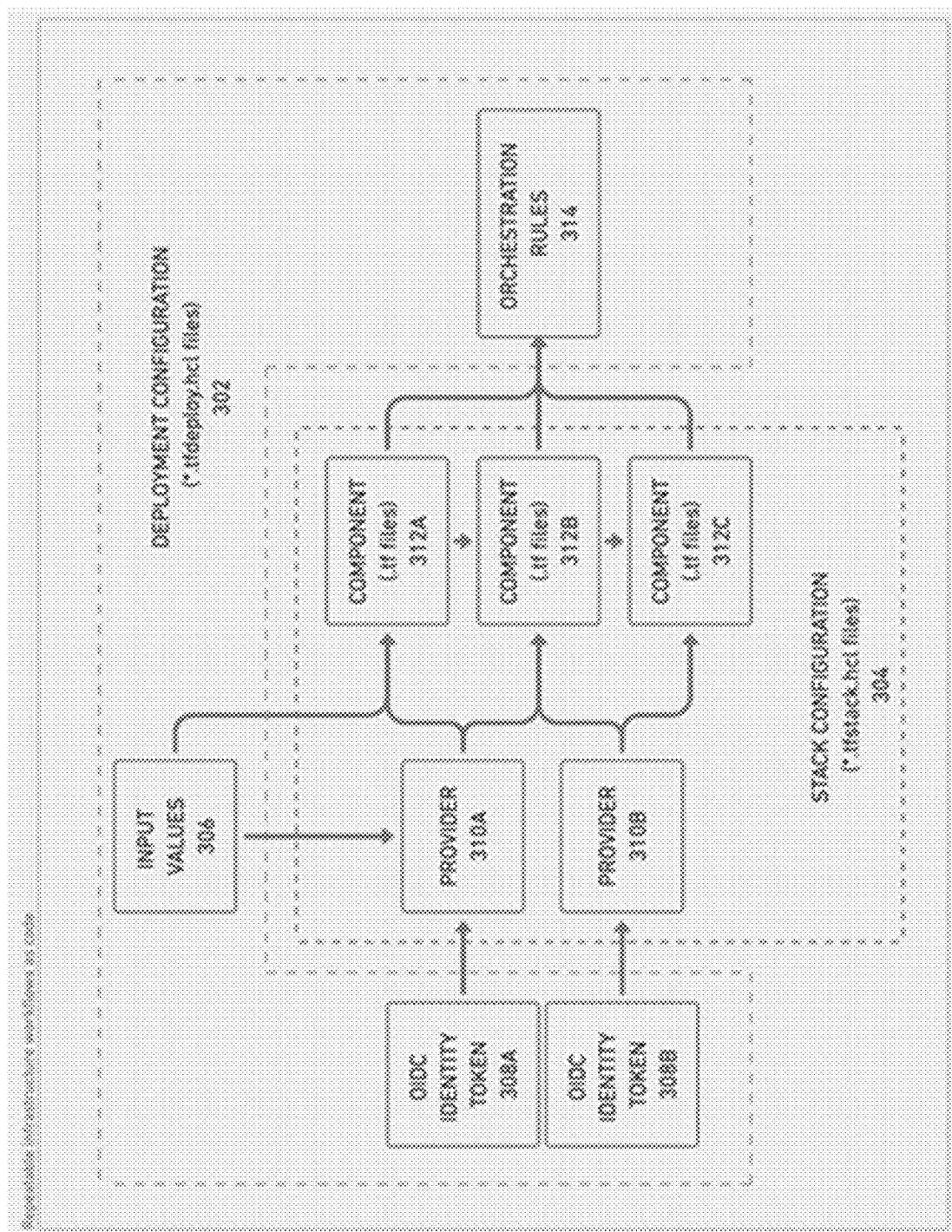
FIG. 3 illustrates repeatable infrastructure workflows at code, in accordance with implementations described herein.

FIG. 3 illustrates repeatable infrastructure workflows at code, in accordance with implementations described herein. Stack configuration files 304 (*.tfstack.hcl) define components 312A-312C and providers 310A and 310B that make up the stack, providing a blueprint for a repeatable unit of infrastructure. Deployment configuration files 302 define the real-world instances of this repeatable infrastructure, including input values 306 and OIDC identity tokens 308A and 308B that are unique to each instance. Orchestration rules 314 allow for defining how changes to each of these instances should be rolled out.

Teams can be assigned different levels of permissions, such as administrative, write, or read-only roles to a stack, as an example. It is possible to configure more fine-grained permissions, rather than coarse grained roles. Teams can also be granted access to multiple stacks through projects. Users can split their stack configuration into multiple files in order to request review by CODEOWNERS (a specific file format used to define which users or teams own or manage a part of the code), code review or other external measures for limiting access.

In a preferred embodiment, deployments of a stack are completely isolated from one another, providing the same isolation guarantees that separate IaC cloud workspaces provide. Each deployment runs isolated in its own agent. Components are logically isolated from one another, but still run in the same agent. Components in a particular stack all get evaluated and executed in the same agent job in the same working directory, so there is no forced isolation between them, but they are "logically" isolated so that execution of one should not affect another.

Figure 4:
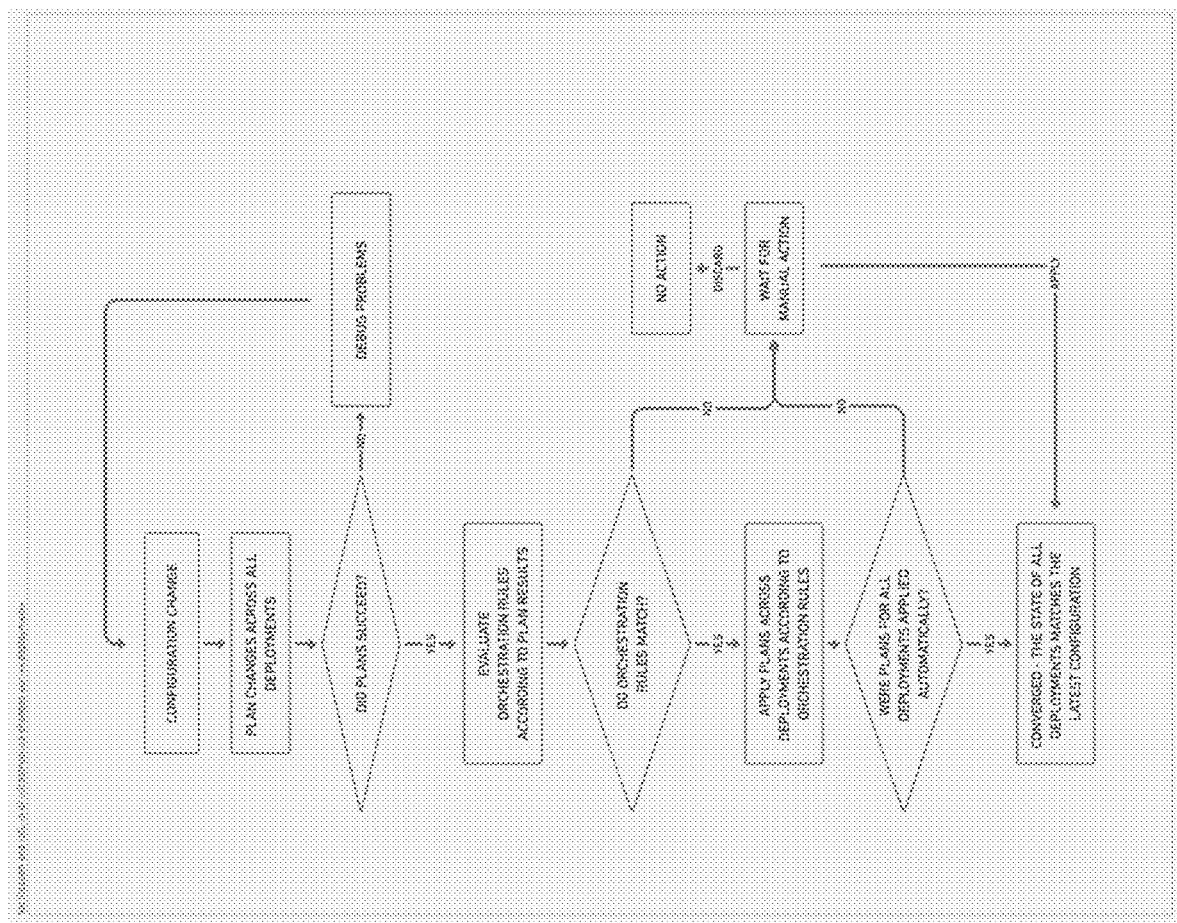
FIG. 4 is a flowchart of a process for verification and rollout of infrastructure changes across deployments.
Figure 5:
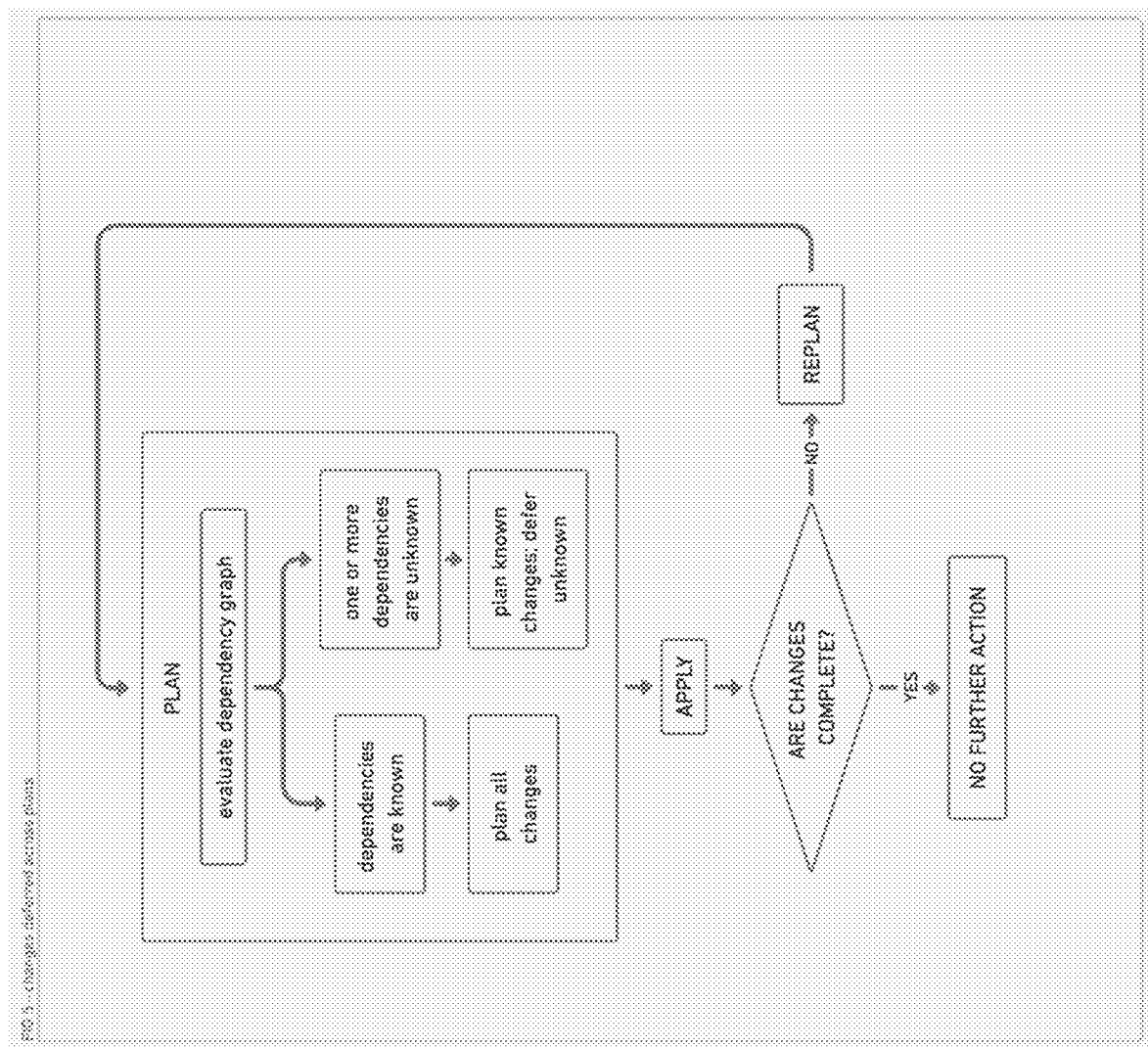
FIG. 5 is a flowchart of a process for deferring changes across plans, in accordance with implementations described herein.

A preferred embodiment of stacks further includes a feature of "deferred changes," in which the IaC tool is directed by the stacks tool to defer changes based on the dependencies. As an example, some operations must be performed first, so the IaC tool can defer subsequent operations until the changed dependencies are available. Accordingly, as shown in FIG. 4, stacks can require the IaC tool to defer planning of certain things if the IaC tool does not have all of the necessary information it needs to plan them in a particular operation, i.e., the execution plan of the IaC tool. Accordingly, stacks allow a user to instruct the IaC tool to allow deployment of cloud infrastructure despite some resources not being planned yet.

Stacks preferably uses an event model for IaC execution via code ingress from a version control system (VCS) provider such as GitHub. For example, changes made in GitHub (e.g., code gets updated) can trigger an event to the cloud infrastructure, which then can be configured to automatically trigger execution of the IaC tool. This enables users to make changes and immediately trigger the IaC tool to plan or apply those changes.

Preferably, instead of workspace run queues, each stack has an event queue from which the IaC tool can gather events, which are typically configuration changes, but can also be deployment events such as drift detection or module version upgrade, and each deployment event in a stack plans and executes changes depending on the queue of events. Deployment events also include actions requested by the user, such as destroying infrastructure or a manual action on a particular deployment. The event queue allows these manual actions to be handled safely so they don't conflict with any ongoing automated actions. Generally, on any event trigger (code update, module version upgrade, etc.) an event is generated. On each event, the IaC determines what changes are needed for each environment/deployment, which includes doing the planning and execution of any changes. The event queue gathers configuration change events (as an example, from Github), but also captures drift or module upgrade events as described in more detail below. This allows IaC tool to intelligently process events in an efficient order. Prior to stacks each "event" was external and was processed sequentially or not at all, causing a host of problems.

An example of drift detection is where the IaC cloud periodically triggers the IaC tool to generate a plan. This refreshes the state to detect any changes in resources that the IaC tool manages to allow the IaC to generate an execution plan. If there are no changes in the environment, the execution plan will be empty. If there is a non-empty execution plan, it means there is a discrepancy between the configuration and the real world, which means "drift" has occurred. As for module version upgrades, these could happen because an initial deployment happened using a module at a point in time, (e.g., version 1), and then in the future a new version of the module (e.g. version 2) is published. A subsequent execution would trigger an upgrade from version 1 to version 2.

As shown in FIG. 3, for orchestration between environments and regions, stacks separate components from deployments, and a useful functionality of stacks is the addition of an advanced orchestration language, which executes orchestration rules 314. For instance, this advanced orchestration language can be added to the *.tfdeploy.hcl file(s) to allow users to define common workflow rules for deployments. In a further example, this function can yield a workflow rule such as applying staging first, and then a change can be rolled out to all production environments at the same time. Another example of a workflow rule is to first deploy to a production environment in a less critical geographical region, and then deploy to more critical regions (e.g.: first deploy changes in APAC, then deploy in EMEA, and finally US)

Figures 6A, 6B:
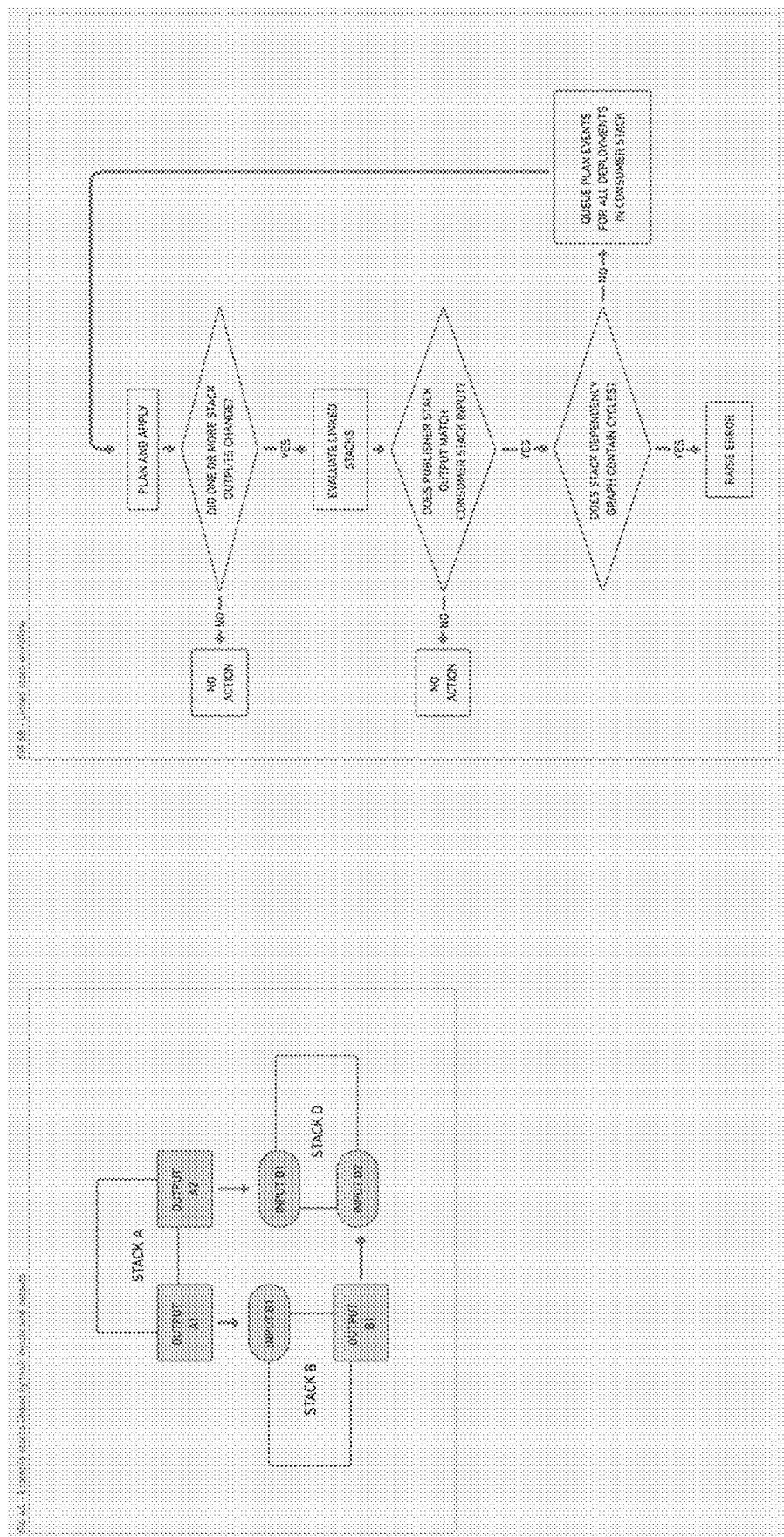
FIG. 6A shows an example of stacks linked by their inputs and outputs.
FIG. 6B illustrates a linked stack workflow, in accordance with implementations described herein.

In some implementations, data between stacks can be utilized in or communicated via an input/output interface that allows for a producer/consumer relationship in a push-based model rather than a conventional pull-based state model, as shown in FIGS. 6A and 6B. For instance, a platform engineering team can co-own shared infrastructure in a stack, exposing things like subnets as output values. Downstream stacks can then utilize these outputs. But instead of a pull-model as state, stacks are able to register downstream consumers of outputs, and changes to those outputs can result in events appearing in downstream stacks. Those events end up in the respective event queues for each stack, resulting in plans for those users to take action on, such as, for example, a shared subnet changing. This shared infrastructure utilized downstream by application teams is a powerful tool for engineering teams.

Accordingly, stacks are a combination of features of an IaC tool like Terraform's runtime (components, deferred changes, etc.), exposed to cloud infrastructure via a dedicated RPC interface (e.g., gRPC), and a set of advanced orchestration capabilities in a cloud computing infrastructure as part of a managed service (which may include, without limitation, deployment workflows, approval workflows, advanced orchestration, access controls, auditing, policy enforcement, etc).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. In an infrastructure-as-code (IaC) tool that is configured for defining IaC configurations comprising containers of interconnected components of a cloud computing platform, a system comprising:
   a graph generator configured to generate a graph of dependencies between the interconnected components of the cloud computing platform based at least in part on user-defined input-output relationships between the interconnected components, wherein the IaC tool is configured to use the graph of dependencies to automatically determine a sequence of the provisioning and deployment of the interconnected components of the cloud computing platform; and
   a remote procedure call interface configured to enable communications between the IaC tool and the cloud computing platform, the remote procedure call interface further configured to enable the provisioning and deployment of the interconnected components of the cloud computing platform, in the determined sequence;
   wherein the generated graph includes one or more references to other cloud computing platforms, and wherein the generated graph includes an ordering mechanism to automatically order component planning and deployment.

2. The system in accordance with claim 1, wherein the graph generator is further configured to replicate the generated graph across one or more deployments of cloud computing platforms.

3. The system in accordance with claim 1, further comprising a container for one or more infrastructure objects defining one or more resources.

4. The system in accordance with claim 1, wherein the IaC tool is further configured to enforce policies defined by a user.

5. The system in accordance with claim 1, further comprising an access controller configured to control access to each component of the interconnected components.

6. A system comprising:
   a graph generator of an infrastructure-as-code (IaC) tool that is configured for generating IaC configurations comprising containers of interconnected components of a cloud computing platform, the graph generator being configured to generate a graph of dependencies between the interconnected components of the cloud computing platform based at least in part on user-defined input-output relationships between the interconnected components, wherein the IaC tool is configured to use the graph of dependencies when managing a deployment of the interconnected components of the cloud computing platform;
   a remote procedure call interface configured to enable communications between the IaC tool and the cloud computing platform, the remote procedure call interface further configured to enable the management of the deployed interconnected components based on the graph of dependencies; and
   a container for one or more infrastructure objects defining one or more resources, and wherein the generated graph includes one or more references to other cloud computing platforms.

7. The system in accordance with claim 6, wherein the graph generator is further configured to replicate the generated graph across one or more deployments of cloud computing platforms.

8. The system in accordance with claim 6, wherein the generated graph includes an ordering mechanism to automatically order component planning and deployment.

9. The system in accordance with claim 6, wherein the IaC tool is further configured to enforce policies defined by a user.

10. The system in accordance with claim 6, further comprising an access controller configured to control access to each component of the interconnected components.

11. A system comprising
    an infrastructure-as-code (IaC) tool that is configured for defining IaC configurations comprising containers of interconnected components of a cloud computing platform;
    a graph generator configured to generate a graph of dependencies between the interconnected components of the cloud computing platform based at least in part on user-defined input-output relationships between the interconnected components, wherein the IaC tool is configured to use the graph of dependencies to automatically determine a sequence of the provisioning and deployment of the interconnected components of the cloud computing platform;
    a remote procedure call interface configured to enable communications between the IaC tool and the cloud computing platform, the remote procedure call interface further configured to enable the provisioning and deployment of the interconnected components of the cloud computing platform, in the determined sequence;
    a container for one or more infrastructure objects defining one or more resources; and
    an access controller configured to control access to each component of the interconnected components.

12. The system in accordance with claim 11, wherein the graph generator is further configured to replicate the generated graph across one or more deployments of cloud computing platforms.

13. The system in accordance with claim 11, wherein the generated graph includes one or more references to other cloud computing platforms.

14. The system in accordance with claim 11, wherein the generated graph includes an ordering mechanism to automatically order component planning and deployment.

15. The system in accordance with claim 11, wherein the IaC tool is further configured to enforce policies defined by a user.

16. A system comprising:
- a graph generator of an infrastructure-as-code (IaC) tool that is configured for generating IaC configurations comprising containers of interconnected components of a cloud computing platform, the graph generator being configured to generate a graph of dependencies between the interconnected components of the cloud computing platform based at least in part on user-defined input-output relationships between the interconnected components, wherein the IaC tool is configured to use the graph of dependencies when managing a deployment of the interconnected components of the cloud computing platform;
- a remote procedure call interface configured to enable communications between the IaC tool and the cloud computing platform, the remote procedure call interface further configured to enable the management of the deployed interconnected components based on the graph of dependencies; and
- an access controller configured to control access to each component of the interconnected components, and wherein the generated graph includes an ordering mechanism to automatically order component planning and deployment.

17. The system in accordance with claim 16, wherein the graph generator is further configured to replicate the generated graph across one or more deployments of cloud computing platforms.

18. The system in accordance with claim 16, further comprising a container for one or more infrastructure objects defining one or more resources.

19. The system in accordance with claim 16, wherein the generated graph further comprises one or more interfaces to other cloud computing platforms.

20. The computer program product in accordance with claim 16, wherein the IaC tool is configured to enforce policies defined by a user.

* * * * *